(12) United States Patent
Kim (10) Patent No.: US 10,541,404 B2
(45) Date of Patent: Jan. 21, 2020

(54) SECONDARY BATTERY AND MANUFACTURING METHOD THEREOF

(71) Applicant: LG Chem, Ltd., Seoul (KR)

(72) Inventor: Seong Min Kim, Daejeon (KR)

(73) Assignee: LG Chem, Ltd. (KR)

( * ) Notice: Subject to any disclaimer, the term of this patent is extended or adjusted under 35 U.S.C. 154(b) by 118 days.

(21) Appl. No.: 15/563,206

(22) PCT Filed: Jun. 30, 2016

(86) PCT No.: PCT/KR2016/007072
§ 371 (c)(1),
(2) Date: Sep. 29, 2017

(87) PCT Pub. No.: WO2017/007176
PCT Pub. Date: Jan. 12, 2017

(65) Prior Publication Data
US 2018/0090739 A1 Mar. 29, 2018

(30) Foreign Application Priority Data
Jul. 3, 2015 (KR) .................. 10-2015-0095444

(51) Int. Cl.
| | |
|---|---|
| H01M 2/26 | (2006.01) |
| H01M 4/72 | (2006.01) |
| H01M 4/74 | (2006.01) |
| H01M 10/04 | (2006.01) |
| H01M 10/0585 | (2010.01) |
| H01M 10/0587 | (2010.01) |
| H01M 10/058 | (2010.01) |

(52) U.S. Cl.
CPC ........... *H01M 2/263* (2013.01); *H01M 2/266* (2013.01); *H01M 4/72* (2013.01); *H01M 4/74* (2013.01); *H01M 4/742* (2013.01); *H01M 10/04* (2013.01); *H01M 10/0431* (2013.01); *H01M 10/058* (2013.01); *H01M 10/0585* (2013.01); *H01M 10/0587* (2013.01)

(58) Field of Classification Search
CPC ........ H01M 2/022; H01M 2/26; H01M 2/263; H01M 2/266; H01M 4/72; H01M 4/74; H01M 4/742; H01M 10/042; H01M 10/0422; H01M 10/0431; H01M 10/058; H01M 10/0585; H01M 10/0587
See application file for complete search history.

(56) References Cited

U.S. PATENT DOCUMENTS

| | | | |
|---|---|---|---|
| 2002/0055768 A1* | 5/2002 | Hess ..................... | A61L 31/048 623/1.13 |
| 2002/0071987 A1 | 6/2002 | Kezuka et al. | |
| 2003/0108787 A1 | 6/2003 | Endo et al. | |
| 2008/0206640 A1 | 8/2008 | Shibata et al. | |
| 2013/0089766 A1* | 4/2013 | Sasaki .................... | H01M 2/263 429/94 |
| 2013/0143090 A1 | 6/2013 | Hosoya et al. | |
| 2014/0030569 A1 | 1/2014 | Kwon et al. | |
| 2014/0370347 A1* | 12/2014 | Jung .................... | H01M 2/0275 429/94 |
| 2014/0377613 A1 | 12/2014 | Kwon et al. | |
| 2015/0026970 A1 | 1/2015 | Jung et al. | |
| 2015/0044536 A1 | 2/2015 | Kwon et al. | |
| 2015/0140382 A1 | 5/2015 | Kako et al. | |
| 2015/0380764 A1 | 12/2015 | Heck et al. | |

FOREIGN PATENT DOCUMENTS

| | | |
|---|---|---|
| EP | 1137088 A1 | 9/2001 |
| EP | 2806476 A1 | 11/2014 |
| JP | H06260172 A | 9/1994 |
| JP | H09129223 A | 5/1997 |
| JP | 2001006749 A | 1/2001 |
| JP | 2001266894 A | 9/2001 |
| JP | 2002222664 A | 8/2002 |
| JP | 2010067443 A | 3/2010 |
| JP | 2013140781 A | 7/2013 |
| JP | 2013218804 A | 10/2013 |
| JP | 2015002173 A | 1/2015 |
| JP | 2015118917 A | 6/2015 |
| JP | 2015518641 A | 7/2015 |
| KR | 20050041655 A | 5/2005 |
| KR | 20080079200 A | 8/2008 |
| KR | 20120103515 A | 9/2012 |
| KR | 20130055712 A | 5/2013 |
| KR | 101383629 B1 | 4/2014 |
| KR | 20140110162 A | 9/2014 |
| WO | 2002043178 A1 | 5/2002 |

OTHER PUBLICATIONS

Machine translation of JP 2001-006749, published on Jan. 12, 2001 (Year: 2001).*
Search report from International Application No. PCT/KR2016/007072, dated Oct. 5, 2016.
Extended European Search Report including Written Opinion for Application No. EP16821582 dated May 11, 2018.

* cited by examiner
(Continued)

Primary Examiner — Anca Eoff
(74) Attorney, Agent, or Firm — Lerner, David, Littenberg, Krumholz & Mentlik, LLP (57) ABSTRACT

The present invention relates to a secondary battery. The secondary battery comprises an electrode assembly, which comprises: a first electrode in which a first notching part is provided; a second electrode in which a second notching part is provided; a first separator interposed between the first electrode and the second electrode; and a second separator disposed on a lower portion of the second electrode, wherein the electrode assembly is folded in a width direction in a state in which the first electrode, the first separator, the second electrode, and the second separator are sequentially stacked and folded and bent through the first and second notching parts.

13 Claims, 13 Drawing Sheets

SECONDARY BATTERY AND MANUFACTURING METHOD THEREOF

CROSS-REFERENCE TO RELATED APPLICATIONS

The present application is a national phase entry under 35 U.S.C. § 371 of International Application No. PCT/KR2016/007072, filed Jun. 30, 2016, published in Korean, which claims priority from Korean Patent Application No. 10-2015-0095444 filed on Jul. 3, 2015, the disclosures of which are incorporated herein by reference.

TECHNICAL FIELD

The present invention relates to a secondary battery, and more particularly, to a secondary battery that is easily folded and bent and a manufacturing method thereof.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders. In recent years, a cable type secondary battery that is freely twisted or bent is being widely used.

DISCLOSURE OF THE INVENTION

Technical Problem

There has been a problem in that the cable type secondary battery according to the related art has a limitation in deformation into various shapes because the cable type secondary battery is not free to be bent.

The present invention has been made to solve the above-mentioned problem, and an object of the prevent invention is to a secondary battery that is easily folded and bent so as to be deformable into various shapes and a manufacturing method thereof.

Technical Solution

To solve the foregoing problems, a secondary battery according to the present invention comprises an electrode assembly, wherein the electrode assembly comprises: a first electrode in which a first notching part is provided; a second electrode in which a second notching part is provided; a first separator interposed between the first electrode and the second electrode; and a second separator disposed on a lower portion of the second electrode, wherein the electrode assembly is folded in a width direction in a state in which the first electrode, the first separator, the second electrode, and the second separator are sequentially stacked and folded and bent through the first and second notching parts.

Each of the first and second notching parts may be provided in plurality, and the plurality of first or second notching parts may be disposed to be spaced apart from each other in a longitudinal direction of the first or second electrode.

Each of the first and second notching parts may be provided in plurality, and the plurality of first or second notching parts may be disposed to be spaced apart from each other in the width direction of the first or second electrode.

The first and second notching parts may be disposed to correspond to each other.

The first or second notching part may be formed in a punching manner.

The first or second notching part may have one of circular, rectangular, and polygonal shapes.

The first or second notching part may be lengthily disposed in the width direction of the first or second electrode.

A first electrode tab may be disposed on one end of the first electrode, a second tab may be disposed on the other end of the second electrode, and when the folded electrode assembly is bent, the first and second electrode tabs may meet to face each other.

A core may be provided in a center of the folded electrode assembly.

The core may be made of a material having flexibility and insulation.

An insulator may be disposed on the outside of the folded electrode assembly.

A method for manufacturing a secondary battery according to the present invention comprises: a step (a) of processing a plurality of first or second notching parts in a surface of first or second electrode; a step (b) of interposing a first separator between the first electrode and the second electrode and stacking a second separator on a lower portion of the second electrode to manufacture an electrode sheet; a step (c) of folding the electrode sheet along a width direction to manufacture an electrode assembly; and a step (d) of forming an insulation surrounding the electrode assembly on the outside of the electrode assembly.

In the step (a), the plurality of first or second notching parts may be formed to be spaced apart from each other in at least one of longitudinal and width directions of the first or second electrode.

The first and second notching parts may be formed to correspond to each other.

In the step (c), the electrode sheet may be folded in the width direction to surround a core having a long bar shape, thereby manufacturing the electrode assembly.

A first electrode tab may be formed on one end of the first electrode, and a second tab may be formed on the other end of the second electrode.

Advantageous Effects

The present invention has effects as follows.

First: the electrode assembly comprising the electrode in which the notching part is disposed may be manufactured to be foldable and bendable and thus to be easily deformed, particularly, deformed into various shapes.

Second: the plurality of notching parts may be disposed in the longitudinal direction or the width direction of the electrode so as to be folded and bent closer to the curved line.

Third: the notching part comprises the first notching part provided in the first electrode and the second notching part. The first notching part and the second notching part may be disposed to correspond to each other. Thus, the first notching part and the second notching part may be folded together with each other to more easily deform the shape of the electrode assembly.

Fourth: each of the first and second notching parts may be manufactured in the punching manner to obtain easy of the processing.

Fifth: the first notching part and the second notching part may be lengthily disposed in the width direction of the first and second electrodes to minimize the strength of the portion at which each of the first and second electrodes is folded so that the first and second electrodes are more easily folded and bent.

Sixth: when the electrode assembly is folded and bent in the ring shape in the state in which the first and second electrode tabs are respectively disposed on the ends of the first and second electrodes, the first and second electrode tabs may face each other to obtain easy in coupling of the electrode lead and in configuration of the package.

Seventh: although the electrode assembly comprising the electrode in which the notching part is provided is used to be wound in the width direction, the electrode assembly may be easily folded and bent by the notching part.

Eighth: the core may be inserted into the center of the electrode assembly that is wound in the roll shape to complement the weak strength of the electrode assembly.

BRIEF DESCRIPTION OF THE DRAWINGS

FIGS. 10 to 13 are views illustrating a state of the secondary battery that is manufactured by the method for manufacturing the secondary battery according to the present invention.

MODE FOR CARRYING OUT THE INVENTION

Hereinafter, an embodiment of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to the Present Invention]

1. Stacked Electrode Assembly

Figure 1:
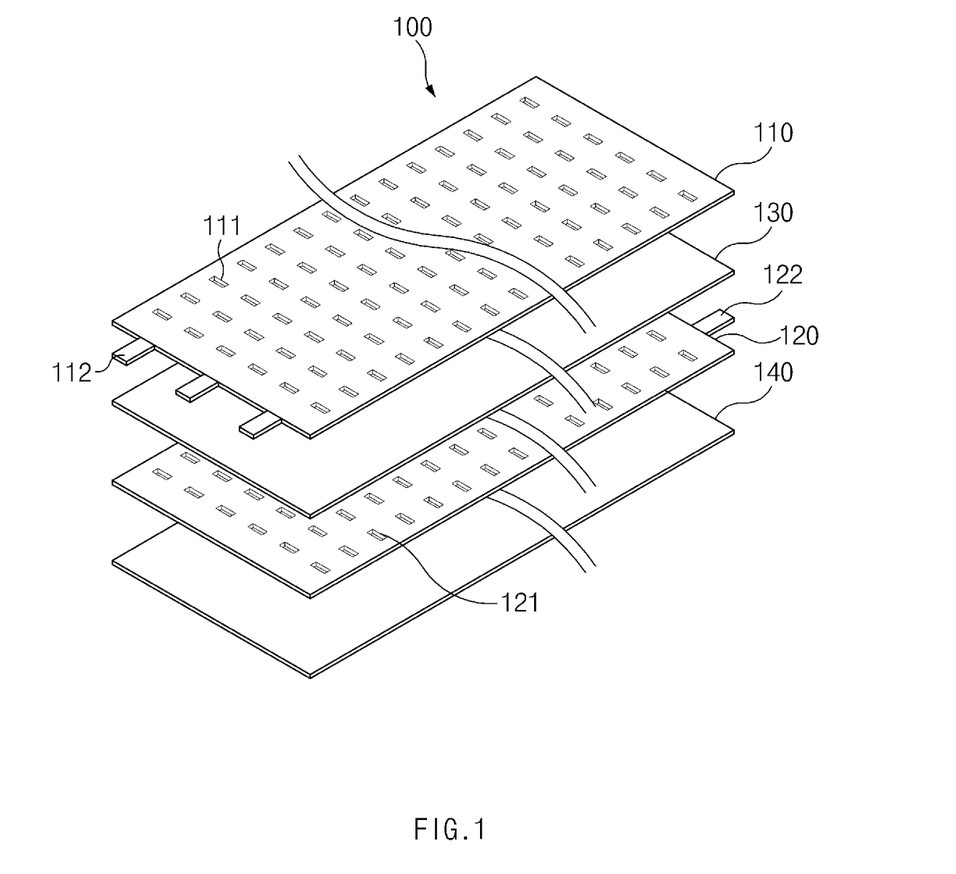
FIG. 1 is an exploded perspective view of a spread electrode assembly according to the present invention.
Figure 2:
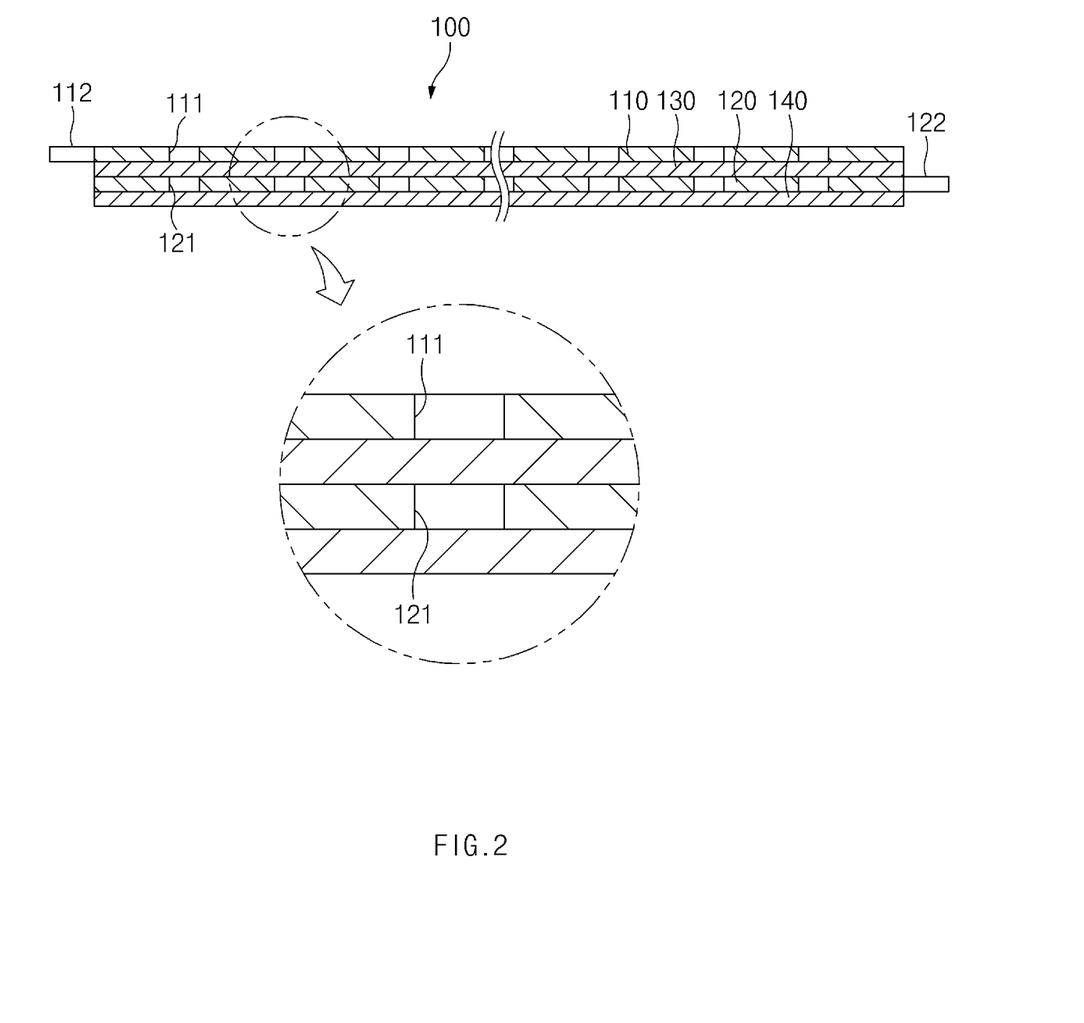
FIG. 2 is a cross-sectional view of FIG. 1.

As illustrated in FIGS. 1 and 2, an electrode assembly 100 according to the present invention has a structure that is easily folded and bent through a notching part. The electrode assembly 100 comprises a first electrode 110 in which a first notching part 111 is provided, a second electrode 120 in which a second notching part 121 is provided, a first separator 130 interposed between the first electrode 110 and the second electrode 120, and a second separator 140 disposed on a lower portion of the second electrode 120, The first electrode 110 comprises a non-coating portion having a long sheet shape and a first electrode active material layer. Here, the first notching part 111 is provided in a surface of the first electrode 110, and the first electrode 110 is folded and bent through the first notching part 111.

Figure 3:
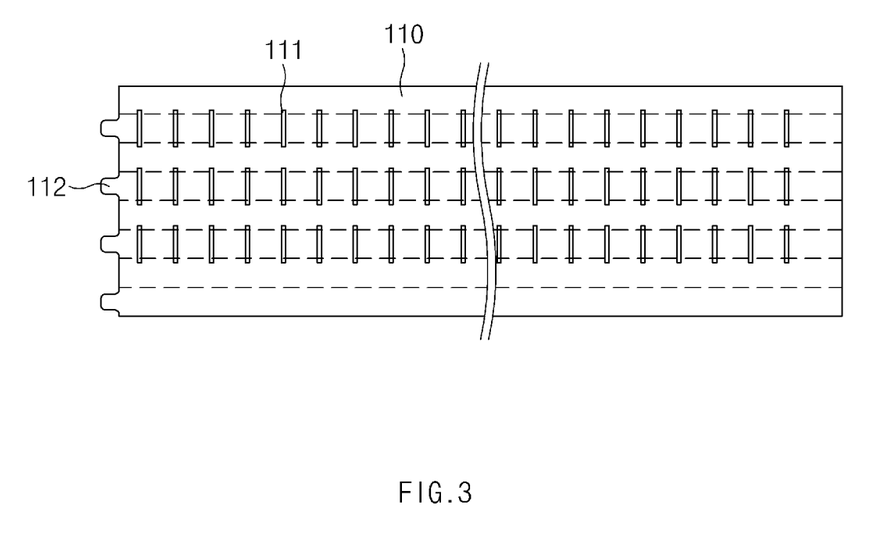
FIG. 3 is a plan view of a first electrode according to the present invention.

For example, referring to FIG. 3, the first notching part 111 is provided in plurality in a longitudinal direction of the first electrode 110, and the plurality of first notching parts 111 are spaced the same interval from each other. That is, the portions, at which the plurality of first notching parts 111 are disposed, may be easily folded to bend the first electrode 110 (see FIG. 5). Particularly, when the number of first notching parts 111 increases, the first electrode 110 may be bent in a shape close to a circular shape. When the number of first notching parts 111 decreases, the first electrode 110 may be bent in at least triangular shape. Thus, the first electrode 110 may be deformed in various shapes.

Here, referring to FIG. 3, the first notching part 111 may be provided in plurality in a width direction (a vertical direction when viewed in FIG. 3) in addition to the longitudinal direction (a horizontal direction when viewed in FIG. 3) of the first electrode 110. That is, the first electrode 110 may be folded and bent in the longitudinal direction and also folded and bent in the width direction. Thus, the first electrode 110 may be deformed in various shapes.

The first notching part 111 may be formed in the surface of the first electrode 110 in a punching manner. That is, the first notching part 111 formed in the punching manner may be easily processed and reduce an area and strength of the first electrode 110 so that the first electrode 110 is easily bent.

The first notching part 111 may be lengthily disposed in the width direction of the first electrode 110 to more reduce the strength of the first electrode 110 in the width direction, and thus, the first electrode 110 may be more easily folded and bent in a ring shape.

As described above, since the plurality of first notching parts 111 is provided in the surface of the first electrode 110, the first electrode 110 may be easily folded and bent in the horizontal or vertical direction.

Figure 4:
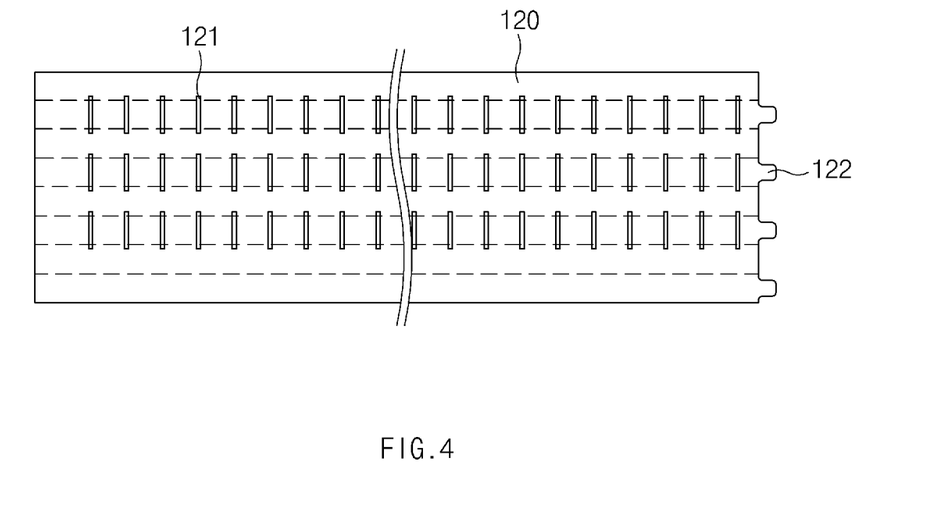
FIG. 4 is a plan view of a second electrode according to the present invention.

The second electrode 120 comprises a non-coating portion having a long sheet shape and a second electrode active material layer. Here, the second notching part 121 is provided in a surface of the second electrode 120, and the second electrode 120 is folded and bent through the second notching part 121.

Figure 5:
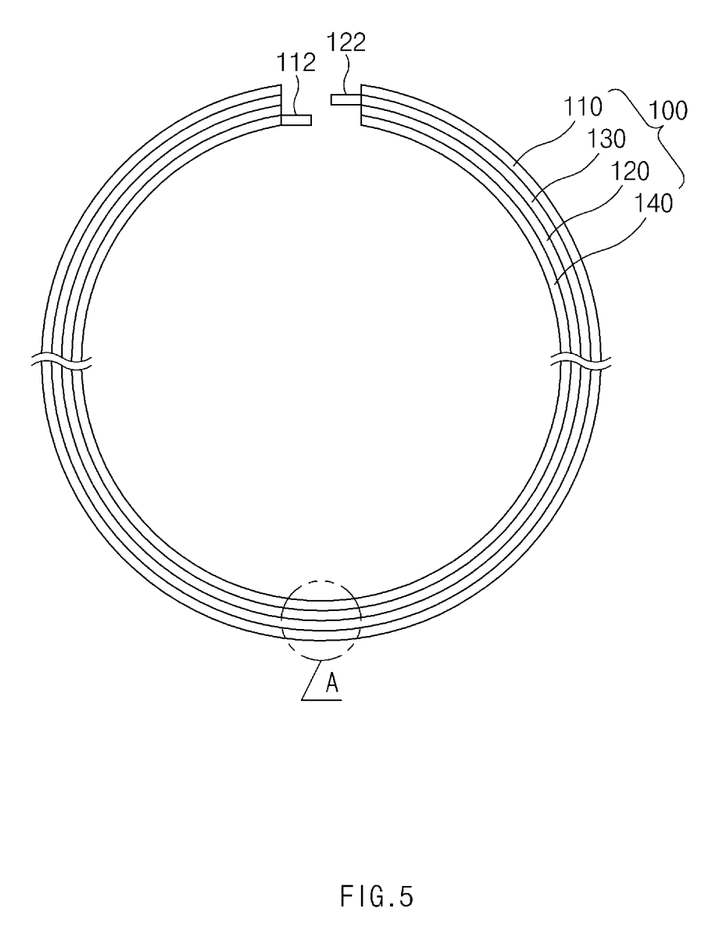
FIG. 5 is a side view of a folded electrode assembly according to the present invention.

For example, referring to FIG. 4, the second notching part 121 is provided in plurality in a longitudinal direction of the second electrode 120, and the plurality of second notching parts 121 are spaced the same interval from each other. That is, the portions, at which the plurality of second notching parts 121 are provided, may be easily folded to bend the first electrode 120 as illustrated in FIG. 5. Particularly, when the number of second notching parts 121 increases, the second electrode 120 may be bent in a shape close to a circular shape. When the number of second notching parts 121 decreases, the second electrode 120 may be bent in at least triangular shape. Thus, the second electrode 120 may be deformed in various shapes.

Here, referring to FIG. 4, the second notching part 121 may be provided in plurality in a width direction (the vertical direction when viewed in FIG. 4) in addition to the longitudinal direction (the horizontal direction when viewed in FIG. 4) of the second electrode 120. That is, the second electrode 120 may be folded and bent in the longitudinal direction and also folded and bent in the width direction. Thus, the second electrode 120 may be deformed in various shapes.

The second notching part 121 may be formed in the surface of the second electrode 120 in a punching manner. That is, the second notching part 121 formed in the punching manner may be easily processed and reduce an area and strength of the second electrode 120 so that the second electrode 120 is easily bent.

The second notching part 121 may be lengthily disposed in the width direction of the second electrode 120 to more reduce the strength of the second electrode 120 in the width direction, and thus, the second electrode 120 may be more easily folded and bent in a ring shape.

As described above, since the plurality of second notching parts 120 is provided in the surface of the second electrode 121, the second electrode 120 may be easily folded and bent in the horizontal or vertical direction.

The first notching part 111 and the second notching part 121 are disposed to correspond to each other. That is, referring to FIG. 5, the first and second notching parts 111 and 121, which are disposed in the first and second electrodes 110 and 120 stacked on each other, may be disposed to vertically correspond to each other. Here, the first and second electrodes 110 and 120 may be folded at the same time by the first and second notching parts 111 and 121 and thus more easily bent.

Each of the first and second notching parts 111 and 121 may have one shape of circular, rectangular, and polygonal shapes. Thus, when each of the first and second electrodes 110 and 120 is folded and bent in various shapes, efficiency may be improved. For example, when each of the first and second notching parts 111 and 121 has the circular shape, each of the first and second notching parts 111 and 121 may be folded in a shape similar to the circular shape and then bent in the circular shape. When each of the first and second notching parts 111 and 121 has the rectangular shape, the folded portion of each of the first and second notching parts 111 and 121 may remain to be bent in the rectangular shape.

As illustrated in FIG. 5, first and second electrode tabs 112 and 122 are disposed on opposite ends of the first and second electrodes 110 and 120, respectively. That is, the first electrode tab 112 is disposed on a left end that is one side of the first electrode 110 as illustrated in FIG. 3, and the second electrode tab 122 is disposed on a right end that is the other side of the second electrode 120 as illustrated in FIG. 4.

Referring to FIG. 5, when the first and second electrodes 110 and 120 are folded and bent in the stacked state, the first and second electrode tabs 112 and 122 meet to face each other. Thus, an electrode lead may be easily connected to each of the first and second electrode tabs 112 and 122, and particularly, connection and connection lines to an electric circuit may be minimized to realize a compact design.

The first and second separators 130 and 140 are configured to prevent the first and second electrodes 110 and 120 from being short-circuited. Each of the first and second separators 130 and 140 may have a size equal to or greater than that of each of the first and second electrodes 110 and 120.

Figure 6:
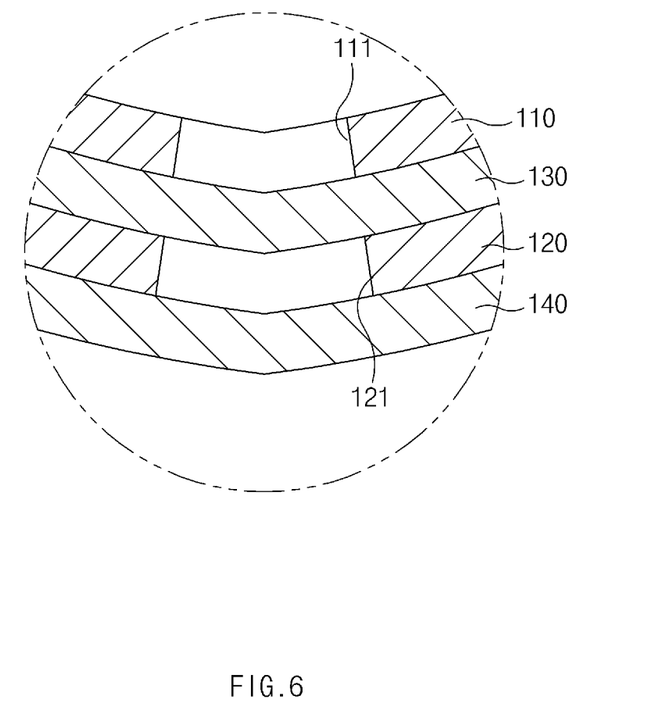
FIG. 6 is an enlarged view illustrating a portion 'A' of FIG. 5.

Referring to FIGS. 5 and 6, the electrode assembly 100 comprising the above-described constituents may have a structure in which the first electrode 110, the first separator 130, the second electrode 120, and the second separator 140 are sequentially stacked. When the stacked electrode assembly 100 is folded in the ring shape, the first and second notching parts 111 and 121, which are respectively provided in the first and second electrodes 110 and 120, may be folded and thus easily bent.

2. Folded Electrode Assembly

Figure 7:
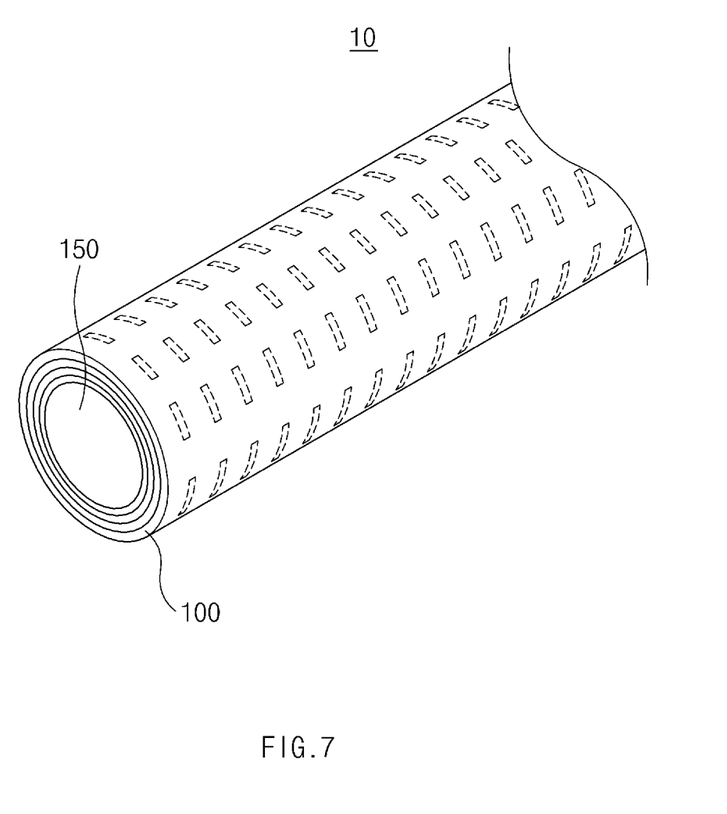
FIG. 7 is a perspective view of the folded electrode assembly according to the present invention.

The electrode assembly 100, in which the first electrode 110, the first separator 130, the second electrode 120, and the second separator 140 are sequentially stacked, may be folded in a roll shape along the width direction and thus provided as the cylindrical electrode assembly 100 as illustrated in FIG. 7.

That is, as illustrated in FIG. 7, when the folded electrode assembly 100 is bent in the ring shape, the electrode assembly 100 may be folded by the first and second notching parts 111 and 121, which are respectively provided in the first and second electrodes 110 and 120, and thus easily bent. Particularly, since the first and second notching parts 111 and 121 are provided in an entire circumferential surface of the folded electrode assembly 100, the electrode assembly 100 may be bent in all directions.

A core 150 is disposed at a center of the folded electrode assembly 100. The core 150 has a long bar shape and is inserted into the center of the folded electrode assembly 100.

Here, the core 150 may be made of a material having flexibility, insulation, and heat-resistance. That is, the core 150 supports the folded electrode assembly 100 so that the electrode assembly 100 is easily folded up to a predetermined angle, but prevented from excessively folded at an angle that is greater than the predetermined angle. That is, the core 150 may support the folded electrode assembly 100 so that the electrode assembly 100 is not completely folded to prevent the short circuit from occurring.

Thus, the folded electrode assembly 100 may be folded and bent in the all direction and thus deformable in more various shapes. As a result, the electrode assembly 100 may be applied to products manufactured in various shapes because the electrode assembly 100 is folded or bent to match the shapes of the products.

[Folded Secondary Battery]

Figure 8:
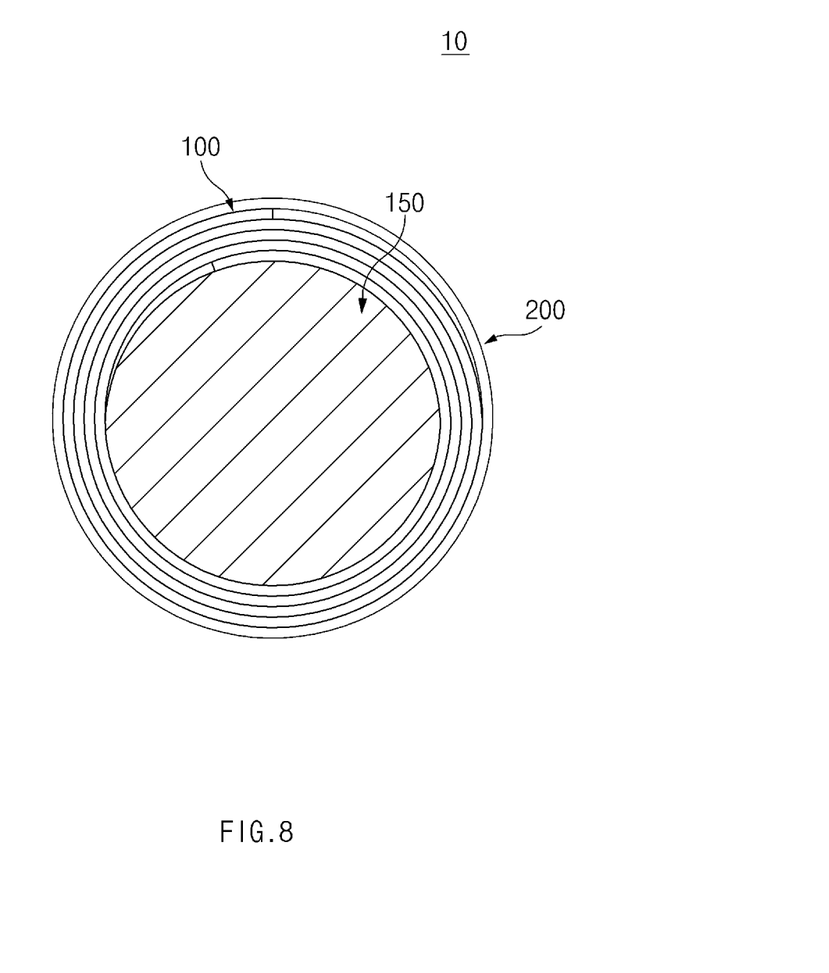
FIG. 8 is a cross-sectional view of a secondary battery comprising the electrode assembly according to the present invention.

The folded electrode assembly 100 comprising the above-described constituents may be provided with an insulator 200 on the outer circumferential surface thereof to constitute a secondary battery 10.

That is, the secondary battery 10 according to the present invention comprises the folded electrode assembly 100 and the insulator 200 coated to surround the outer circumferential surface of the folded electrode assembly 100. Thus, the secondary battery 10 that is deformable in various shapes may be provided.

[Method for Manufacturing Folded Secondary Battery]

A method for manufacturing the secondary battery comprising the above-described constituents will be described below.

Figure 9:
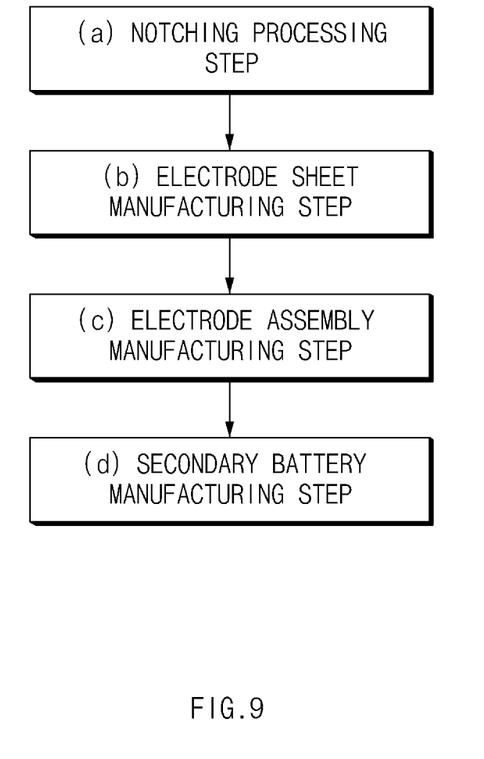
FIG. 9 is a flowchart illustrating a method for manufacturing the secondary battery according to the present invention.

As illustrated in FIG. 9, a method for manufacturing a folding type secondary battery according to the present invention comprises: a step (a) of processing a plurality of first or second notching parts in a surface of a first or second electrode; a step (b) of interposing a first separator between the first and second electrodes and stacking a second separator on a lower portion of the second electrode to manufacture an electrode sheet; a step (c) of folding the electrode sheet in a width direction to manufacture an electrode assembly; and a step (d) of forming an insulator on the outside of the electrode assembly to surround the electrode assembly.

Figure 10:
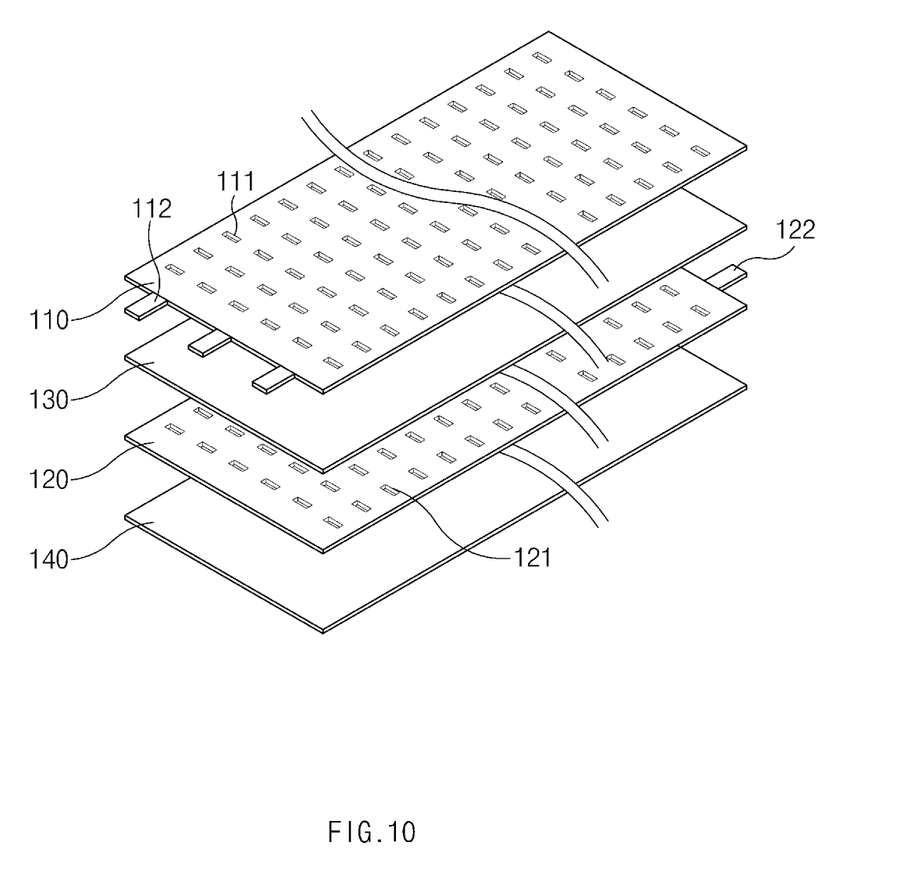
FIG. 10 is a view illustrating a state before the electrode assembly is stacked.

As illustrated in FIG. 10, in the step (a), the first and second electrodes 110 and 120 on which first and second electrode tabs 112 and 122 are respectively formed in opposite directions, are prepared. Also, a first or second notching part 111 or 121 formed in a punching manner is processed in a surface of the first or second electrode 110 or 120.

That is, the surface of the first or second electrode 110 or 120 is punched by using a punching device (not shown) to process the first or second notching part 111 or 121. Here, the first or second notching part 111 or 121 is provided in plurality in longitudinal and width directions of the first or second electrode 110 or 120.

Particularly, in the step (a), the first or second notching part 111 or 121 may be lengthily formed in the width direction of the first or second electrode 110 or 120. Thus, the electrode assembly may be more easily folded in a ring shape.

Also, in the step (a), the first and second notching parts 111 and 121 may be disposed to correspond to each other. Thus, the first and second electrodes 110 and 120 may be folded at the same position to allow the electrode assembly to be more easily folded.

Also, in the step (a), the plurality of first or second notching parts 111 or 121 may be formed to be spaced the same interval from each other in the first or second electrode 110 or 120. Thus, the first or second electrode 110 or 120 may be folded and bent in a shape similar to a circular shape.

Figure 11:
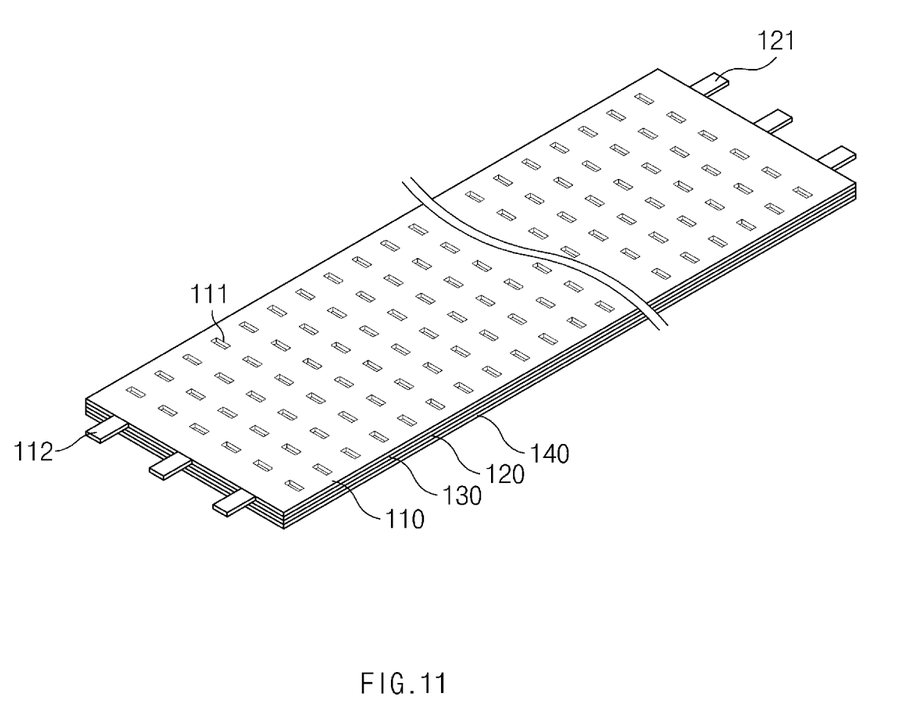
FIG. 11 is a view illustrating a state after the electrode assembly is stacked.

As illustrated in FIG. 11, in the step (b), the first separator 130 is interposed between the first electrode 110 and the second electrode 120, and the second separator 140 is stacked on the lower portion of the second electrode 120 to manufacture the electrode sheet. As a result, the electrode sheet has a structure in which the first electrode, the first separator, the second electrode, and the second separator are sequentially stacked.

Figure 12:
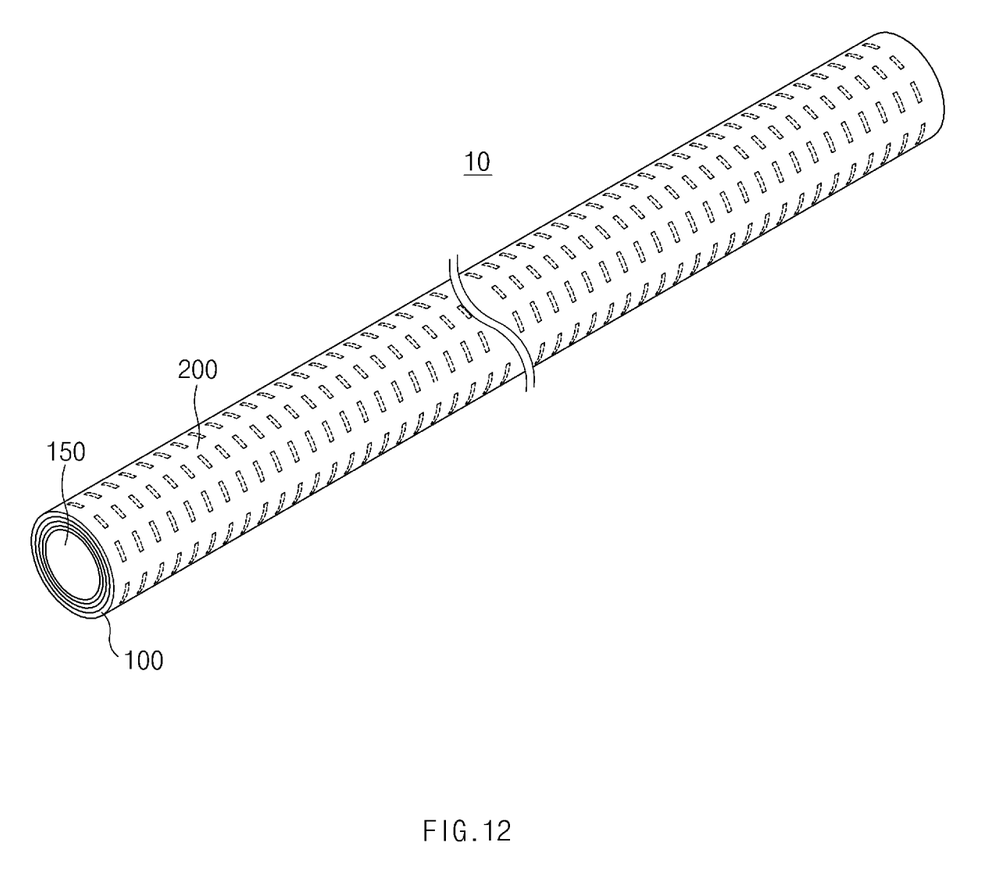
FIG. 12 is a folded state of the electrode assembly.
Figure 13:
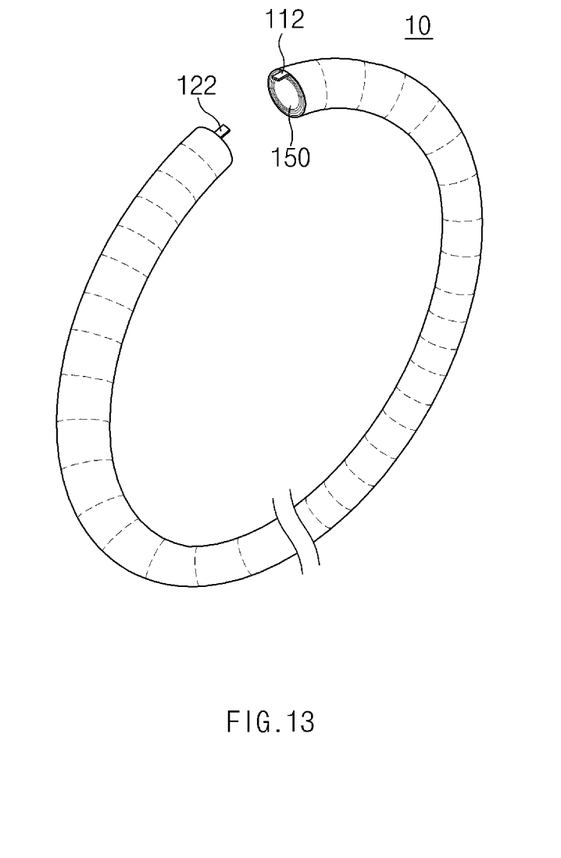
FIG. 13 is a view illustrating the folded secondary battery.

As illustrated in FIGS. 12 and 13, in the step (c), the electrode sheet is folded along the width direction to manufacture the electrode assembly 100. Here, a core 150 is inserted into a center of the electrode assembly 100. That is, in the step (c), the electrode sheet is folded along the width direction to surround the core 150 having a long bar shape and thereby to manufacture the electrode assembly 100, thereby preventing the electrode assembly 100 from being easily bent or excessively folded.

In the step (d), an insulator 200 surrounding the electrode assembly 100 is formed on the outside of the electrode assembly 100. When the process is completed as described above, the secondary battery 10 may be completely manufactured.

Therefore, as illustrated in FIG. 13, the folded secondary battery 10 according to the present invention may be easily folded and bent in the ring shape and thus deformed in various shapes.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising an electrode assembly, wherein the electrode assembly comprises:
 a first electrode in which a first notching part is provided;
 a second electrode in which a second notching part is provided;
 a first separator interposed between the first electrode and the second electrode; and
 a second separator disposed on a lower portion of the second electrode,
 wherein the electrode assembly is in a state in which the first electrode, the first separator, the second electrode, and the second separator are: (i) sequentially stacked, (ii) folded in a width direction, and (iii) bent in a longitudinal direction perpendicular to the width direction such that a bending angle is produced only through a combination of individual bends of the first electrode and the second electrode at the locations of each of the first and second notching parts,
 wherein the first or second notching part is lengthily disposed in the width direction of the first or second electrode.

2. The secondary battery of claim 1, wherein each of the first and second notching parts is provided in plurality, and the plurality of first or second notching parts are disposed to be spaced apart from each other in a longitudinal direction of the first or second electrode.

3. The secondary battery of claim 1, wherein each of the first and second notching parts is provided in plurality, and the plurality of first or second notching parts are disposed to be spaced apart from each other in the width direction of the first or second electrode.

4. The secondary battery of claim 1, wherein the first or second notching part is formed in a punching manner.

5. The secondary battery of claim 1, wherein the first or second notching part has one of circular, rectangular, and polygonal shapes.

6. The secondary battery of claim 1, wherein a first electrode tab is disposed on an end of the first electrode, a second electrode tab is disposed on an end of the second electrode, and the first and second electrode tabs face each other.

7. The secondary battery of claim 1, wherein a core is provided in a center of the folded electrode assembly.

8. The secondary battery of claim 7, wherein the core is made of a material having flexibility and insulation.

9. The secondary battery of claim 1, wherein an insulator is disposed on the outside of the folded electrode assembly.

10. A method for manufacturing a secondary battery, the method comprising:
 a step (a) of processing a plurality of first and second notching parts in a respective surface of first and second electrodes, respectively;
 a step (b) of interposing a first separator between the first electrode and the second electrode and stacking a second separator on a lower portion of the second electrode to manufacture an electrode sheet;
 a step (c) of folding the electrode sheet along a width direction to manufacture an electrode assembly;
 a step (d) of bending the electrode assembly in a longitudinal direction perpendicular to the width direction such that a bending angle is produced only through a combination of individual bends of the first electrode and the second electrode at the locations of each of the plurality of first and second notching parts; and
 a step (e) of forming an insulation surrounding the electrode assembly on the outside of the electrode assembly,
 wherein each of the plurality of first and second notching parts is lengthily disposed in the width direction of the first or second electrode.

11. The method of claim 10, wherein, in the step (a), the plurality of first and second notching parts are formed to be spaced apart from each other in at least one of longitudinal and width directions of the first or second electrode.

12. The method of claim 10, wherein, in the step (c), the electrode sheet is folded in the width direction to surround a core having a long bar shape, thereby manufacturing the electrode assembly.

13. The method of claim 10, wherein a first electrode tab is formed on one end of the first electrode, and a second tab is formed on the other end of the second electrode.

* * * * *